United States Patent
Moriyama et al.

(10) Patent No.: US 6,193,920 B1
(45) Date of Patent: *Feb. 27, 2001

(54) PROCESS FOR PRODUCING A GOLF BALL

(75) Inventors: Keiji Moriyama; Takeshi Asakura, both of Shirakawa (JP)

(73) Assignee: Sumitomo Rubber Industries, Ltd., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/674,570

(22) Filed: Jul. 5, 1996

(30) Foreign Application Priority Data

Jul. 7, 1995 (JP) .................................................. 7-171865

(51) Int. Cl.⁷ ........................... B29C 39/10; B29C 39/12; B29C 45/14; B29C 45/16
(52) U.S. Cl. ......................... 264/250; 264/255; 264/275; 264/278; 264/279.1; 264/308
(58) Field of Search .................................... 264/255, 275, 264/278, 308, 279.1, 250; 273/235 R; 473/373, 374, 377

(56) References Cited

U.S. PATENT DOCUMENTS

| 696,866 | * | 4/1902 | Kempshall | ............................ 264/308 |
| 3,317,646 | * | 5/1967 | Dames, Jr. | ............................ 264/308 |
| 4,919,434 | * | 4/1990 | Saito | .................................... 273/235 |
| 5,556,098 | * | 9/1996 | Higuchi et al. | ....................... 473/373 |

FOREIGN PATENT DOCUMENTS

2278609 * 7/1994 (GB) ............................... 273/235 R

* cited by examiner

Primary Examiner—Jan H. Silbaugh
Assistant Examiner—Edmund H. Lee
(74) Attorney, Agent, or Firm—Birch, Stewart, Kolasch & Birch, LLP

(57) ABSTRACT

A golf ball having a cover thickness of 3.0 to 5.0 mm is produced by a process which includes providing a core; covering the core with a cover composition to form a first cover layer having a thickness of 30 to 70% of a total cover thickness; and further covering the first cover layer with the same cover composition to form a second cover layer having a thickness sufficient to form the total cover thickness.

13 Claims, 1 Drawing Sheet

PROCESS FOR PRODUCING A GOLF BALL

FIELD OF THE INVENTION

The present invention relates to a process for producing a golf ball comprising a core and a cover formed on the core, wherein the cover has a thickness of 3.0 to 5.0 mm.

BACKGROUND OF THE INVENTION

Golf balls are generally composed of a core and a cover covering the core, and the cover is generally formed from ionomer resin and has a thickness of 2.4 mm or less. The cover thickness of less than 2.4 mm has been required in view of the producing process.

However, it has been recently proposed that the cover be made thicker than the conventional thickness to add another function. For example, the cover is made having a thickness of 3.0 to 5.0 mm and the core is made softer, which attains a higher hit angle and lower spin amount and results in enhancement of flight performance. As mentioned above, however, a thick covering on the core gives rise to some problems in the producing process. The covering process is generally conducted by injection molding or press molding, but the following three problems would occur:

(1) The cover thickness is non-uniform and the sphericity of the resulting golf ball is deteriorated in comparison with the conventional golf ball having a cover thickness of up to 2.4 mm.

(2) When injection molding, the cores are held by holding pins in a mold and the traces of the holding pin remain in the produced golf balls. The holding pin traces produce bad effects in the durability of the golf balls.

(3) When injection molding, the cover resin contracts a little. The thicker the cover, the larger the contraction, and the resulting golf balls often have a smaller diameter than required by he PGA rules.

SUMMARY OF THE INVENTION

The present invention provides a solution of the above mentioned problems in the production process of a golf ball having a cover thickness of 3.0 to 5.0 mm. The process of the present invention comprises:

providing a core, covering the core with a cover composition to form a first cover layer having a thickness of 30 to 70% of a total cover thickness, and further covering the first cover layer with the same cover composition to form a second cover layer having a thickness sufficient to form the total cover thickness.

The core preferably has a JIS-C hardness of not less than 50 and the cover preferably has a melt index (MI) of not less than 0.5.

The second covering process is preferably conducted at least 10° C. higher than the first covering process.

DETAILED DESCRIPTION OF THE INVENTION

Figure 1:
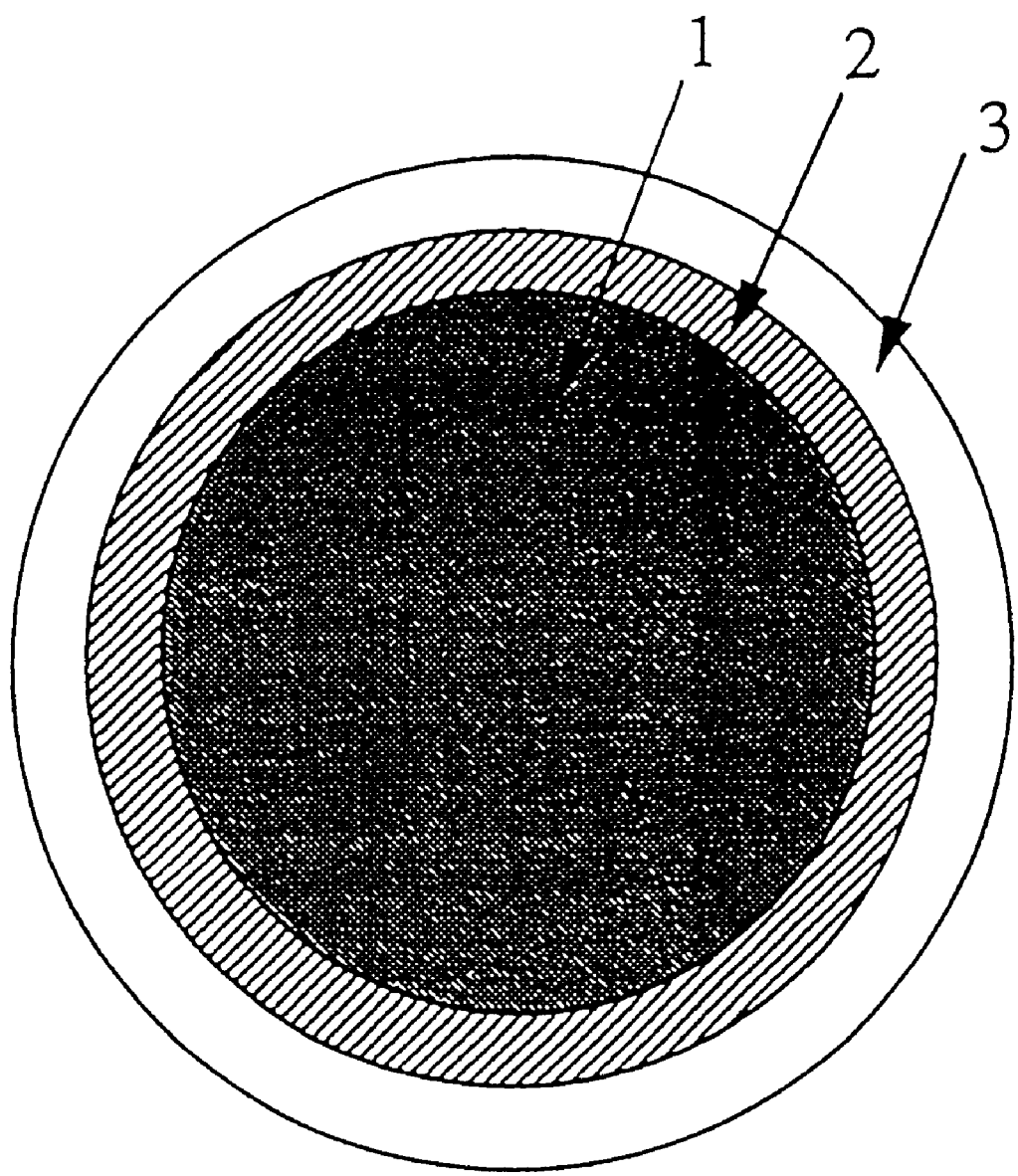
FIG. 1 schematically shows a cross-section of the golf ball of the present invention.

In the process of the present invention, the covering process is divided into two steps, of which the first step covers 30 to 70%, preferably 40 to 60% of the total cover thickness and the second step forms the remaining cover thickness. The process can maintain a high sphericity of the resulting golf ball and reduce any non-uniformity of the cover thickness. The process of the present invention can reduce the deterioration of the ball durability which is caused by traces of the holding pins when injection molding.

The core employed in the present invention can be either a solid core for a solid golf ball or a thread wound core for a thread wound golf ball, but the core preferably has a JIS-C hardness of not less than 50, more preferably 60 to 80. When the JIS-C hardness is less than 50, the core may be deformed when holding it by the holding pin in injection molding. The term "JIS-C hardness" equals to Shore C hardness. The core generally has a diameter of 30 to 39 mm, preferably 33 to 37.5 mm.

In case of the solid core, the core is generally prepared by vulcanizing a rubber composition in a mold. The rubber composition for the solid core is known to the art, but generally comprises a base rubber, such as high-cis polybutadiene; a co-crosslinking agent, such as zinc (meth) acrylate; an organic peroxide; filler; and the like.

The thread wound core is composed of a solid or liquid center and a thread rubber layer formed on the center. The solid center is generally prepared from the same rubber composition as the solid core mentioned above. The liquid core can be a rubber bag into which a liquid paste containing water, a viscosity controlling agent, a specific gravity controlling agent and the like is encapsulated. The thread rubber for winding on the center can be generally prepared by vulcanizing natural rubber or synthetic isoprene rubber.

The conventional golf ball was obtained by injection molding or press molding a cover resin composition only once. According to the present invention, the covering process is divided into two steps, of which the first step covers 30 to 70%, preferably 40 to 60% of the total cover thickness which is within the range of 3.0 to 5.0 mm, and the second step covers the remaining thickness of the cover. The cover resin composition for the cover is the same in the first and second steps. The cover resin composition may be composed of an ionomer resin or balata and a small amount of additives (such as pigment, fluorescent agent, fluorescent brightener, ultraviolet absorber etc.). The ionomer resin preferably has a melt index (MI) of not less than 0.5, more preferably 1.5 to 5.0. Examples of the preferred ionomer resins are Hi-milan # 1605, # 1706, available from Mitsui Polychemical Co., Ltd., and the like. If the melt index is less than 0.5, the ionomer resin has good flowability and has good moldability. By the term "melt index" is meant a resin amount (g) which is extruded from an orifice having a diameter of 2.1 mm (0.0825 inches) and a length of 8 mm for 10 minutes, when applying a pressure of 2,160 g (44 psi) at 190° C. to the resin (see ASTM 1238, DIN 53735 and BS 2782).

The second covering step is conducted at least 10° C., preferably 10 to 20° C. higher than the first step, because the first cover layer is melted when covering the second cover layer. Golf balls generally have many recessions called "dimple" on the surface. In the process of the present invention, the dimples can be formed in the second covering step.

The covering step is conducted by press molding or injection molding, but the injection molding is preferred. The total cover thickness is within the range of 3.0 to 5.0 mm. The final golf ball is generally coated with paint to put into the market.

FIG. 1 schematically shows a cross-section of the golf ball of the present invention. In FIG. 1, 1 shows a core on which a first cover layer 2 is formed. Then a second cover layer 3 is formed on the first cover layer 2.

EXAMPLES

The present invention is illustrated by the following Examples which, however, are not to be construed as limiting the present invention to their details.

Examples 1–5 and Comparative Examples 1–3

Preparation of cores A, B and C

The cores A, B and C were prepared by mixing the following ingredients to form a rubber composition and vulcanizing it for 30 minutes at 145° C. and for 8 minutes at 165° C. in a mold.

|  | Parts by weights | | |
| --- | --- | --- | --- |
| Ingredients | A | B | C |
| BR-18[*1] | 100 | 100 | 100 |
| Zinc Acrylate | 22 | 13 | 28 |
| Zinc oxide | 31.2 | 35.6 | 24.63 |
| Antioxidant[*2] | 0.5 | 0.5 | 0.5 |
| Dicumyl peroxide | 1.6 | 1.0 | 1.0 |
| Diphenyl sulfide | 0.6 | — | 0.5 |

[*1]High cis polybutadiene rubber available from Japan Synthetic Rubber Co., Ltd.
[*2]Available from Yoshitomi Seiyaku K.K. as Yoshinox 425.

The resulting cores were subjected to a determination of diameter and JIS-C hardness and the results are shown in Table 1.

Preparation of golf balls

The resulting cores were covered with the following cover resin composition. The golf balls of Examples 1–5 were covered by two steps, for which cover thicknesses, percentages of the total cover thickness and molding temperature in each step, and a total cover thickness are shown in Table 1. For Comparative Examples 1 and 2, the covering process was conducted not by two steps but one step. For Comparative Example 3, the covering process was conducted by two steps, but cover thickness percentages of the total cover thickness in each step is outside the claimed range.

| Ingredients | Parts by weight |
| --- | --- |
| Hi-milan # 1706[*3] | 50 |
| Hi-milan # 1605[*4] | 50 |

[*3]Ionomer resin having a melt index of 1.7, available from Mitsui Polychemical Co., Ltd.
[*4]Ionomer resin having a melt index of 2.8, available from Mitsui Polychemical Co., Ltd.

The obtained golf balls were coated with paint to for golf balls for Examples 1–5 and Comparative Example 1–3. The golf balls were subjected to an evaluation of durability and sphericity as explained hereinafter, and the results are shown in Table 1.

Durability: A golf ball were repeatedly hit by a driver equipped at a swing robot available from True Temper Co., Ltd. at a head speed of 45 m/s, until the golf ball was broken. Number of hitting was expressed as an index calculated as the number of Comparative Example 3 being 1.

Sphericity: An ununiformity of cover was determined using X ray. A distribution of cover thickness from an average cover thickness is expressed as percentage and shown in Table 1.

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Core |  |  |  |  |  |  |  |  |
| Core formulation | A | A | A | C | B | B | A | A |
| Diameter (mm) | 35.5 | 35.5 | 35.5 | 36.3 | 35.5 | 35.5 | 35.5 | 35.5 |
| JIS-C hardness | 68 | 68 | 68 | 65 | 45.5 | 45.5 | 68 | 68 |
| First step |  |  |  |  |  |  |  |  |
| Cover thickness (mm) | 1.8 | 1.8 | 1.1 | 1.6 | 1.8 | 3.6 | 3.6 | 0.7 |
| Cover thickness (%) | 50 | 50 | 30.6 | 50 | 50 | 100 | 100 | 19.4 |
| Molding temp. (° C.) | 200 | 200 | 200 | 200 | 200 | 200 | 200 | — |
| Second step |  |  |  |  |  |  |  |  |
| Cover thickness (mm) | 1.8 | 1.8 | 2.5 | 1.6 | 1.8 | — | — | 2.9 |
| Cover thickness (%) | 50 | 50 | 69.4 | 50 | 50 | — | — | 80.6 |
| Molding temp. (° C.) | 200 | 215 | 215 | 215 | 215 | — | — | — |
| Total cover thickness (mm) | 3.6 | 3.6 | 3.6 | 3.2 | 3.6 | 3.6 | 3.6 | 3.6 |
| Durability (index) | 1.18 | 1.20 | 1.15 | 1.25 | 1.12 | 0.40 | 0.50 | 1 |
| Sphericity (%) | 7 | 7 | 9 | 5 | 11 | 36 | 28 | 14 |

As is apparent from the above results, the golf balls of Examples 1–5 have excellent durability and excellent sphericity although they have a total cover thickness of 3.2 to 3.6 mm, but those of Comparative Examples have very poor durability and sphericity.

What is claimed is:
1. A process for producing a golf ball having excellent durability and excellent sphericity comprising a core and a cover having a total cover thickness of 3.0 to 5.0 mm, formed on the core, comprising:
   providing a core, wherein said core is a solid core formed from vulcanized rubber, or said core is a thread wound core comprising a liquid or solid center and a thread rubber layer formed on the liquid or solid center, covering the core with a cover composition by press-molding or injection molding to form a first cover layer having a thickness of 30 to 70% of the total cover thickness, and, further covering the first cover layer with the same cover composition by press-molding or injection molding to form a second cover layer having a thickness sufficient to form the total cover thickness, wherein said cover composition has a melt index of not less than 0.5, wherein the second cover layer is formed at a temperature of at least 10° C. higher than the first cover layer, and wherein said cover composition is formed from balata or ionomer resin.

2. The process according to claim 1 wherein said core is a solid core formed from a vulcanized rubber and said cover composition is formed from ionomer resin.

3. The process according to claim 1 wherein said core is a thread wound core comprising a liquid or solid center and a thread rubber layer formed on the liquid or solid center, and said cover composition is formed from balata or ionomer resin.

4. The process according to claim 1 wherein said core has a JIS-C hardness of not less than 50.

5. The process according to claim 4 wherein said core has a JIS-C hardness of 60 to 80.

6. The process according to claim 1 wherein said core has a diameter of 30 to 39 mm.

7. The process according to claim 1 wherein said cover composition has a melt index of 1.5 to 5.0.

8. The process according to claim 1 wherein said core has a diameter of 33 to 37.5 mm.

9. The process according to claim 1 wherein the first cover layer has a thickness of 40 to 60% of the total cover thickness.

10. The process according to claim 1 wherein the second cover layer is formed at least 10 to 20° C. higher than the first cover layer.

11. A process for producing a golf ball having excellent durability and excellent sphericity comprising a core and a cover having a total cover thickness of 3.0 to 5.0 mm, formed on the core, comprising:

providing a core, wherein said core is a solid core formed from vulcanized rubber, or said core is a thread wound core comprising a liquid or solid center and a thread rubber layer formed on the liquid or solid center, covering the core with a cover composition by press-molding or injection molding to form a first cover layer having a thickness of 30 to 70% of the total cover thickness, and, further covering the first cover layer with the same cover composition by press-molding or injection molding to form a second cover layer having a thickness sufficient to form the total cover thickness, wherein said cover composition has a melt index of not less than 0.5, wherein the second cover layer is formed at a temperature of 15° C. higher than the first cover layer, and wherein said cover composition is formed from balata or ionomer resin.

12. The process according to claim 11 wherein said core is a solid core formed from a vulcanized rubber and said cover composition is formed from ionomer resin.

13. The process according to claim 11 wherein said core is a thread wound core comprising a liquid or solid center and a thread rubber layer formed on the liquid or solid center, and said cover composition is formed from balata or ionomer resin.

* * * * *